United States Patent [19]

Millheiser et al.

[11] 4,099,444
[45] Jul. 11, 1978

[54] RADIALLY ASSEMBLED FRICTION-GRIP SELF-LOCKING RINGS

[75] Inventors: Melvin Millheiser, North Bellmore; Wallace H. Berliner, Floral Park, both of N.Y.

[73] Assignee: Waldes Kohinoor, Inc., Long Island, N.Y.

[21] Appl. No.: 775,946

[22] Filed: Mar. 9, 1977

Related U.S. Application Data

[63] Continuation-in-part of Ser. No. 702,074, Jul. 2, 1976, abandoned, which is a continuation-in-part of Ser. No. 577,985, May 16, 1975, abandoned.

[51] Int. Cl.² .............................................. F16B 21/00
[52] U.S. Cl. ...................................................... 85/8.8
[58] Field of Search ....................................... 85/8.8, 51

[56] References Cited

U.S. PATENT DOCUMENTS

| | | | |
|---|---|---|---|
| 1,915,640 | 6/1933 | Alsaker | 85/8.8 |
| 2,136,155 | 11/1938 | Spicacci | 85/8.8 |
| 2,491,306 | 12/1949 | Feitl | 85/8.8 |
| 2,574,034 | 11/1951 | Heimann | 85/8.8 |
| 3,987,697 | 10/1976 | Wurzel | 85/8.8 |

FOREIGN PATENT DOCUMENTS

| | | | |
|---|---|---|---|
| 812,134 | 8/1951 | Fed. Rep. of Germany | 85/8.8 |
| 878,130 | 6/1953 | Fed. Rep. of Germany | 85/8.8 |

*Primary Examiner*—Marion Parsons, Jr.
*Attorney, Agent, or Firm*—J. Harold Kilcoyne

[57] ABSTRACT

A spring retaining ring adapted to self-lock, i.e., friction-grip, itself by spring force to a cylindrical surface such as that of a grooveless carrier member (shaft, rod, pin, etc.), the body of said ring being of novel design and incorporating means endowing it with the capability of being assembled on a grooveless cylindrical carrier member by either the radial or the more conventional axial assembly procedure, whichever is the more convenient.

4 Claims, 9 Drawing Figures

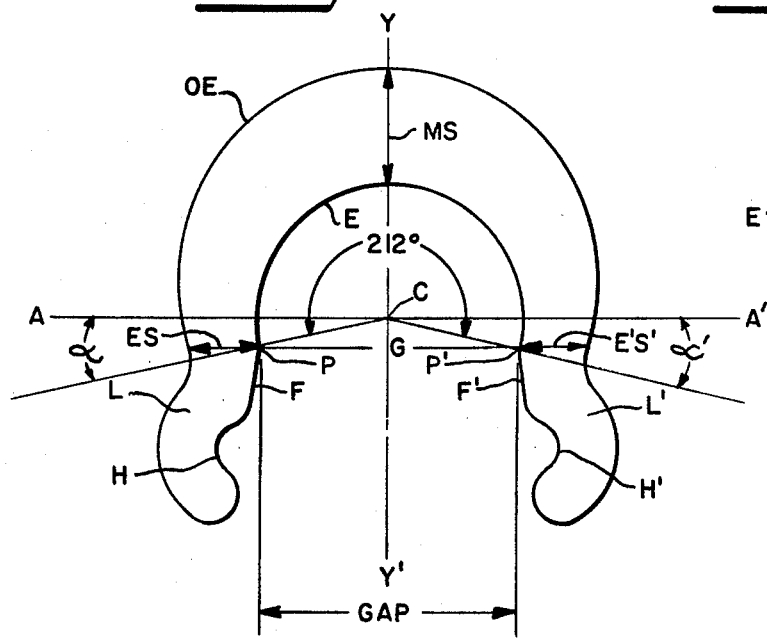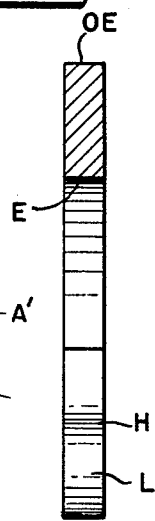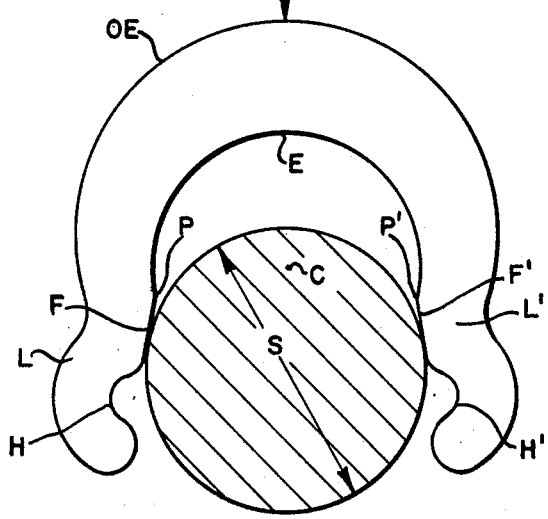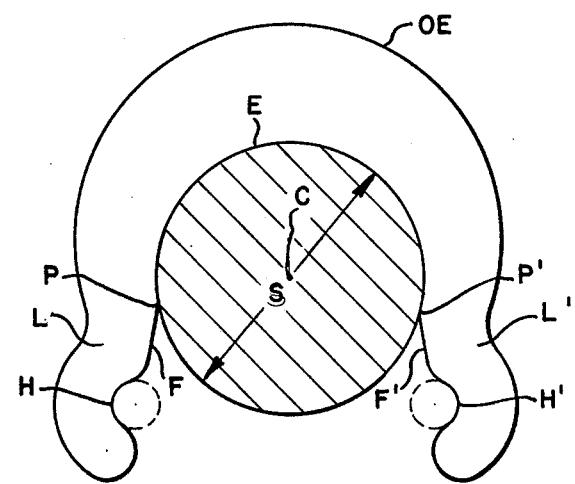

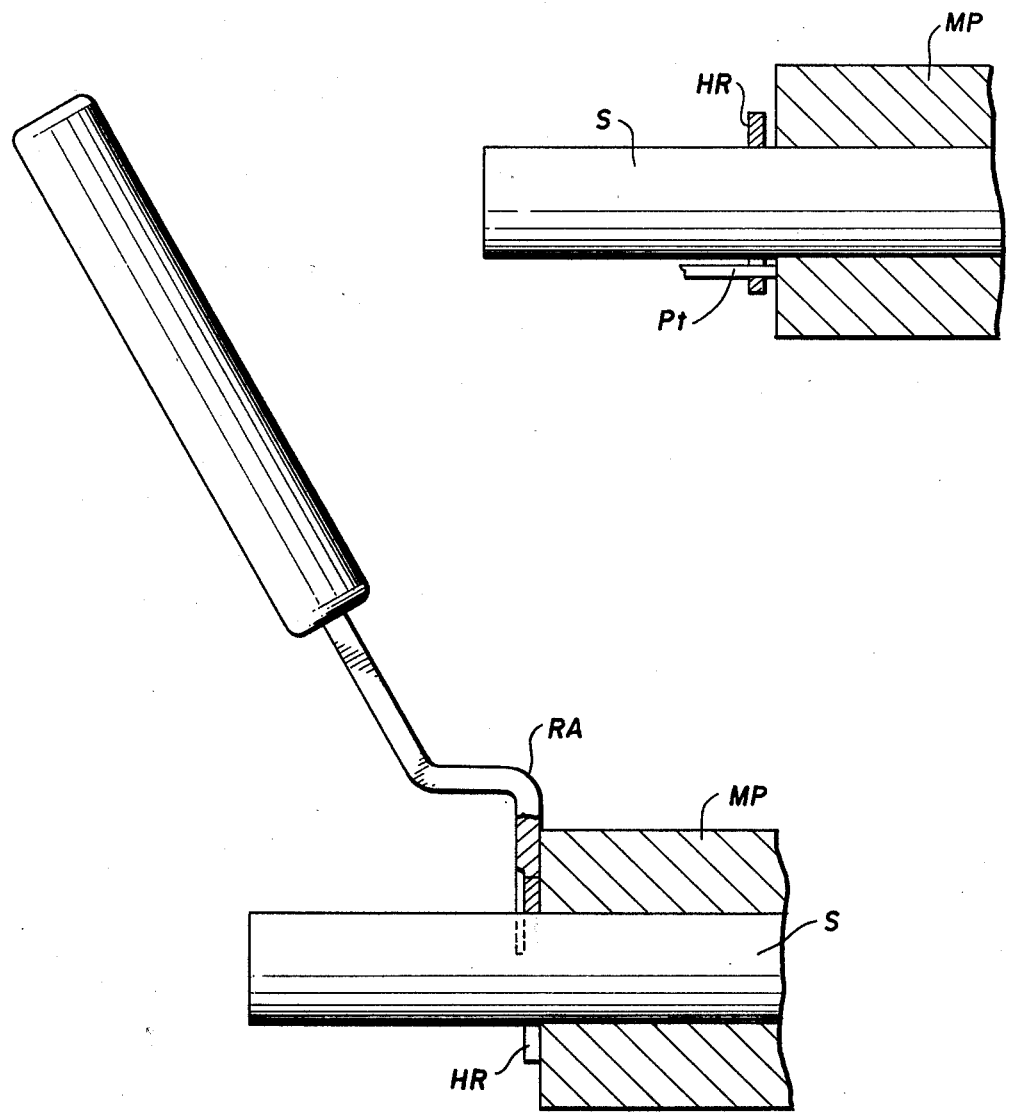

RADIALLY ASSEMBLED FRICTION-GRIP SELF-LOCKING RINGS

APPLICATION HISTORY

The present application is a continuation-in-part of application Ser. No. 702,074, filed July 2, 1976, which is a continuation-in-part of application Ser. No. 577,985, filed May 16, 1975, both now abandoned.

INTRODUCTION

This invention relates to improvements in spring retaining rings of the self-locking or friction-gripping type capable upon proper assembly thereon of providing an artificial parts-retaining and/or locating shoulder on a cylindrical shaft, spindle, pin, etc., and more particularly to an open-ended self-locking retaining ring which is based on a novel concept in ring-body design, by a width of gap between its open ends and by a unique construction of the ring ends which define said ring gap, all of which combine to endow rings constructed according to the invention with the capability of being assembled on a grooveless shaft, etc., by either the radial or the axial procedure, whichever is determined to be the more convenient.

BACKGROUND OF THE INVENTION

Self-locking retaining rings, i.e., rings which possess the capability of securing themselves to smooth cylindrical surfaces such as those of grooveless shafts, spindles, pins and the like (for convenience hereinafter termed carrier members) solely by the friction grip which their inner edges exert on said surfaces, are known in the art, as evidenced by the patent to Heimann U.S. Pat. No. 2,574,034 Nov. 6, 1951. However, such known rings intended for assembly on grooveless carrier members suffer the disadvantage that, because of the narrow-width of the opening between their ends, they can be assembled on their cylindrical carrier members only by the so-called axial assembly procedure, which for the external form of such a ring involves spreading of the ring ends by a limited amount such that the ring inner-edge diameter is slightly greater than that of the carrier member and thereupon with care being taken not to overspread the ring and with the ring ends held spread apart, bodily shifting the ring body over the end of the carrier member and axially therealong to a desired or preselected position in which it is to serve as a parts-retaining or -locating shoulder, whereupon upon its release it self-locks itself in place.

Various attempts have heretofore been made to design a retaining ring having a width of gap enabling its radial assembly, i.e., assembly by first (usually manually) bringing the ring to a preselected position as aforesaid and thereupon forcing the ring downwardly over the carrier member, the width of gap between the ends of the ring and the spring nature of the metal from which the ring was fashioned permitting such movement. Generally speaking, such attempts resulted in a widely gapped ring having a so-called crescent-shaped ring body as disclosed and claimed in the patents to Feitl U.S. Pat. No. 2,491,306 dated Dec. 13, 1949 and-/or Brozek U.S. Pat. No. 2,382,947 dated Aug. 4, 1945.

However, the crescent-shaped ring proved to be successful only on grooved carrier members, due to the fact that, because of its extreme gap width and relatively low section height, it lacked the capability of self-locking itself with the requisite security to grooveless carrier members and, while capable of being assembled in shaft grooves, it soon became evident that the crescent-shaped ring was suited to being assembled only in grooves of but shallow to moderate depth.

SUMMARY OF THE INVENTION

The herein invention provides an arcuate i.e. open-ended ring body characterized by a continuous inner edge extending along and throughout the major arc of a circle of diameter substantially equalling that of the grooveless cylindrical shaft, rod, pin, etc., on which the ring is to be assembled, said ring body being characterized further by section heights (radial sections) which decrease progressively from the ring-body middle-section having maximum section height and which is disposed on the vertical center-line of the arcuate ring body, to end sections having minimum (equal) radial height which are disposed symmetrically to the sides of said vertical center line, whereby the ring body maintains circularity in deformation as when the ends of the ring body are spread within the elastic range. Furthermore, the spacing between the points on said continuous inner edge of the ring body whereat said body has minimum section height is slightly less than the diameter of the grooveless shaft.

More importantly, and as will be later explained in greater detail, the ring body of the invention considered as a curved tapered bending beam is further characterized by the following design features which taken together are believed to represent a concept in ring construction which represents an advance in the art, which features are generally stated as follows: (1) a novel ratio of the inside diameter of the bending beam in its unstressed state to the seating diameter on which the ring is assembled; (2) a novel ratio of the free inside diameter of the ring body to the maximum section height of the ring middle-section; (3) a novel ratio of the ring-body minimum section height to the ring-body maximum section height; (4) a novel degree of spreading of the ring body within the permissible range; and (5) by the gap angles $a, a'$ i.e. the angles each formed between two lines of which the first is a line thru the center of the ring inside diameter perpendicular to a line bisecting the ring gap and the second is a line thru said center to the endmost points on the ring inside diameter, being substantially smaller than heretofore known or considered possible.

Additionally, the ring end-formations beyond and leading to the gap are specially and uniquely fashioned i.e. they preferably take the form of relatively elongate legs having mutually facing, straightway extending edges which diverge (are slanted) from said endmost points on the ring inside diameter by a slight but none-the-less appreciable angle outwardly from one another and from the downwardly extended vertical center line of the arcuate ring body. In effect, said mutually facing, straight-way extending, divergent edges of the downwardly extending end-formations or legs define an elongate passageway of decreasing width leading to the gap which serves as a means for progressively spreading the ring-body ends apart the small predetermined amount required for the radial assembly of the ring on a grooveless shaft.

To provide for ring assembly by the more conventional axial assembly procedure, the facing divergent edges of the end formations may be provided adjacent their free ends with mutually facing arcuate recesses positioned and sized for the reception of the points of usually hand-operated tools commonly employed to spread the ring-body apart.

It is to be noted that the relatively greater length of said end formations (legs), in contrast to the short length of projection of apertured ears or of short-length lugs formed with simple facing recesses, provides a ring constructed according to the present invention with the capability of being assembled by either the radial or axial procedures, as such are explained in the foregoing.

Referring now to the drawings illustrating a self-locking ring of the novel body design and which is provided with end-formations (legs) of unique construction leading to the ring-body gap, FIGS. 1 and 2 are plan or face views looking onto a ring as proposed in its free or unstressed state (FIG. 1), said FIG. 1 view also illustrating the gap angles $\alpha, \alpha'$ according to the invention, whereas FIG. 2 illustrates said ring about to be assembled on a grooveless carrier member (shaft) shown in section, by the radial assembly procedure; and FIG. 1A is a section taken on the vertical center line Y—Y' of FIG. 1;

FIG. 3 is a plan or face view of a ring according to the invention shown following its assembly on a grooveless carrier member (shaft, etc.) also shown in section, with assembly assumed to have been performed by the preferred radial or by the more conventional axial assembly procedure;

Figure 4:
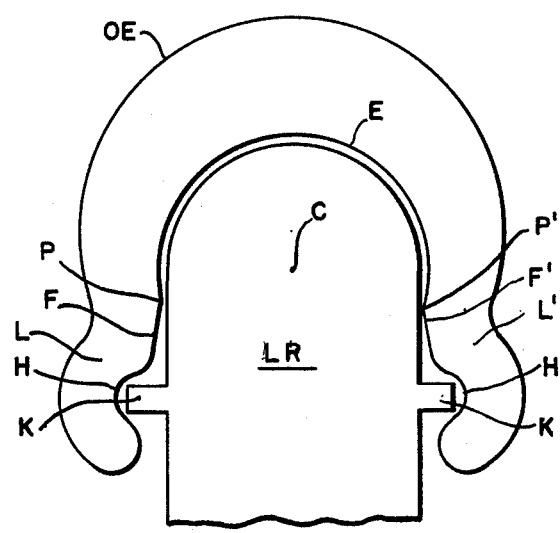
FIG. 4 is a plan or face view of a ring of the invention illustrating its capability of being held to a rail on which a stack of vertical rings is mounted for feed movement therealong by protruding ribs provided on said rail, according to the invention.

FIG. 7 is a view illustrating an objectionable condition arising when attempt is made to assemble, by means of conventional tools, a ring such as the aforementioned Heimann ring, on a carrier member (shaft) in face-abutting relation to a part to be retained already mounted on said member; and FIG. 8 is a generally similar view illustrating the capability of a ring of the herein invention being radially assembled on a similar carrier member (shaft) in direct face-abutting relation to the part to be retained thereby, by means of a known-type ring applicator.

As illustrated, the improved ring of the invention comprises an open-ended arcuate ring body characterized by a continuous inner edge E which extends throughout the major arc of a circle struck from the ring center C and an outer circular edge OE extending throughout substantially the same arc but which is eccentric to the inner circular edge in direction such that the section heights (radial sections) of said arcuate ring body decrease progressively from its middle section MS of maximum section height to end sections ES and E'S' of minimum section heights, the latter of which are at points P, P' along its said inner edge which are disposed symmetrically to the sides of and at equal distances from the vertical center line Y—Y', whereby the ring body will maintain circularity in deformation as does the ring body of the aforementioned Heimann patent. It is to be understood that the distance G (FIG. 1) between the points P—P' represents the width of the ring gap in the free or unstressed state of the arcuate ring body and that said gap width is slightly less than the diameter of the cylindrical carrier member (shaft, spindle, etc.) for which the ring is designed.

However, before considering in detail at this point of the disclosure the gap width and the construction of the ring-body end formations which lead to the gap, a discussion of the novel ring-body design features will be had, as follows:

Said ring body is to be considered as a curved tapered beam subject when assembled to forces acting radially outwardly against its inner edge. According to the invention which is believed to represent a novel concept in ring design, the ratio of the inside diameter of the ring-body, considered as a curved tapered being beam, in the unstressed state thereof to the seating diameter, i.e. its inside diameter which it assumes when assembled, is less than 1; the ratio of the free inside diameter of the ring body to the maximum section height of the ring-body middle section MS can vary down to values as small as 1.5 to 2.5, (with such varying proportions making possible more than one ring design for the same shaft size and a corresponding variation in ring-body holding power); the ratio of ring-body minimum section height (ES, E'S') to maximum section height MS may vary between 0.6 and 0.8 (such permitting thicker rings and thus stronger rings having proportionately greater holding power than any comparable prior art ring as exemplified by the aforementioned Heimann patent); a ring body characterized by a degree of spreading of its inner diameter within the permissible elastic range varying up to 8.5% (i.e. from 6–8.5%), which degree of spreading is substantially greater than the 5% maximum spreading characterizing said above identified prior art ring. This substantially greater degree of permissible spreading featuring the present ring body is highly important because it permits the use of lower section-height rings sometimes called for in installations or assemblies wherein clearance limits for rings are present.

Yet another important design feature is that the ring of the invention is characterized by gap angles $\alpha, \alpha'$, each being the angle subtended between two lines, of which one is the line A, A' from the center C of the ring inside diameter E which is perpendicular to the line Y—Y' bisecting the ring gap and the second is a line from the same center C to each of the endmost points P and P', (termed the "real" end points) on the ring inside diameter, which angle is very much smaller than that of any known prior ring. In practical manufacture each said gap angle $\alpha, \alpha'$ according to the novel design of the ring of the invention is always less than 16°, although being variable from 9° to 16°.

Now as to the ring-body end-formation or leg features, in contrast to said ring body being provided at its ends with short-length lugs or ears (usually apertured) as heretofore, the end formations of the arcuate ring body of the present invention are formed as relatively downwardly extending, elongate legs L—L' whose mutually facing edges F—F' extend straightway for equal appreciable distances from said points P—P' and divergently by a small angle with respect to one another and to the extended vertical center line Y—Y'. Thus, said mutually facing straight-way extending, divergent edges F—F' of said leg formations L—L' combine to provide a passageway of gradually decreasing width leading to the ring gap G and thence to the ring-body opening.

As above stated, the width of said gap G is slightly less than the diameter of the carrier member (shaft etc.) S on which a ring according to the invention is to be assembled, whereas the spacing between the extreme (distal) end portions of the legs L—L' is appreciably greater than said carrier-member diameter. Accordingly, by reference to FIG. 2, a ring to be assembled by the radial assembly technique can be placed on the carrier member at the desired location therealong at which it is to serve as an artifical parts-retaining shoulder or collar, at which location the ring will be preliminarily held with a light hang-up action on said member in readiness for its final assembly, with the final assembly step being effected by force applied in the direction of the arrow A against its upper outer edge (see FIG. 2).

To provide for assembly of the herein ring by the more conventional axial assembly procedure for friction-grip self-locking rings, the leg formations L—L' are provided also with facing notch-form recesses H—H' disposed relatively below the aforementioned straightway extending, divergent edges F—F', which facing recesses are sized and located to receive the points of conventional ring-spreading tools (indicated in broken lines in FIG. 3) by which the ring can be opened up the limited amount necessary to the ring being spread over the end of a shaft etc. and then shifted axially therealong to a preselected position at which it is to provide a parts-locating shoulder or collar and thereupon released to grip the surface thereof.

Also, the notch-form recesses H—H' serve the additional purpose of providing for the reception of longitudinal, laterally protruding ribs or keys K—K' provided on a longitudinal rail LR on which a plurality of rings constructed according to the present invention may be arranged in stack formation. In explanation, according to modern mass production methods, rings of the invention are oriented and stacked so that they can be used in various assembly tools which are fitted with rails for holding the ring stacks and along which rails the rings of the stack are intended to move as they are used. Because some small clearance between rings of the stacks thereof and the rail is necessary to the relatively free movement of the ring stacks along a rail, rings characterized by a width of gap as herein provided could easily fall off said rail. To prevent any such occurrence, the aforesaid laterally protruding ribs K—K' are formed on the rail, and by their projection into the recesses, serve to hold the rings to the rail, while at the same time assuring the necessary clearance between the rings of the stacks and said rail surface.

Figure 5:
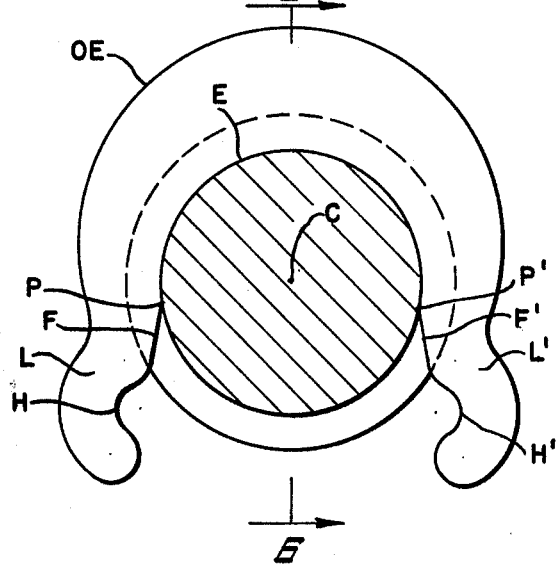
FIG. 5 is a plan or face view and FIG. 6 a section taken on the vertical center line of FIG. 5, which illustrate the capability of a ring according to the invention being assembled in the groove of a carrier member (shaft) by the radial-assembly procedure, it being assumed that said groove may have appreciably greater depth than that of conventional shaft grooves.
Figure 6:
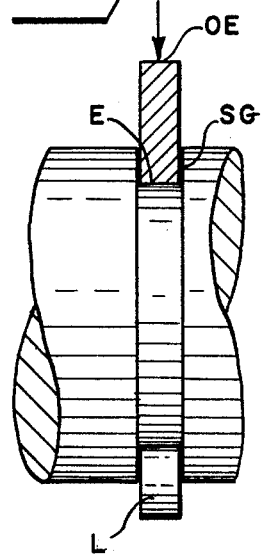

FIGS. 5 and 6 seek to illustrate the capability of rings of the invention being assembled in shaft grooves, as well as on grooveless shafts, by the radial assembly procedure not heretofore considered possible of attainment, and also that the shaft grooves SG in which such form of assembly is made possible by the invention may be substantially deeper than herefore considered feasible. That is to say, the ring as herein proposed may be preliminarily assembled to the cylindrical groove bottom-wall just as in FIG. 2 and then finally assembled by moderate force applied to the ring upper-outer edge in the direction of the arrow A' shown in FIG. 6.

The ring of the present invention offers yet another advantage over any known prior art self-locking ring as exemplified by the Heimann U.S. Pat. No. 2,574,034. More particularly, whereas the conventional Heimann ring is one requiring axial assembly by means of plier-like tools capable of spreading the ends of the ring and, in the use of such tools, the tips or points of the tools normally extend through the holes or notches in the ring lugs to a degree that they protrude beyond the ring thickness as shown in FIG. 7, such being necessary for the ring to be secure on the plier tips when it is being expanded for installation. Thus, as shown in FIG. 7, during the initial installation, the plier tips designated Pt protrude through the ring and beyond its rearward face and will strike the machine part MP to be retained, thereby preventing the ring HR from abutting the retained part MP without some undesirable axial spacing between ring and machine part.

To correct this undesirable condition by still using the same tools, it was necessary to withdraw the tool tips or points from the ring-lug apertures and then make another try at spreading the ring without the objectionable tip protrusion, and if successful, then force the ring up against the retained part by means or procedures such as that of striking the ring, hopefully to cause it to slide off the tool tips until it directly abuts the machine-part face without any spacing therebetween.

FIG. 8 illustrates the capability of a ring of the invention being installed radially and in direct face-abutting relation with the retained part by use of a hand applicator RA whose working end is preferably of the type normally used for radial ring assembly. Thus it will be seen that a ring of the invention is capable of being installed more rapidly and without subsequent tool-position adjustment being necessary to eliminate any axial play and/or spacing between ring and retained part, in contrast to the assembly procedure illustrated in and described in connection with FIG. 7.

It is intended that all matter contained in the above description and/or shown in the accompanying drawing figures shall be interpreted as illustrative and not in a limiting sense.

Having disclosed our improved ring-body design and ring-end and gap-defining construction, we make the following claims therefor:

We claim:

1. A retaining ring adapted for either radial or axial assembly on a cylindrical groveless carrier member and which upon assembly possesses the capability of securing itself solely by the friction grip which its inner edge exerts on the surface of said carrier member, said ring comprising an open-ended ring body of spring material having the form of a curved tapered bending beam whose inner edge extends along the arc of a circle of diameter less by a predetermined small amount than that of the cylindrical carrier-member surface and whose outer edge is eccentric to said inner edge in direction such that the ring-body section heights decrease progressively from its middle section having maximum section height to its end sections having minimum section height, said end sections being at points of the ring inner-edge which are disposed symmetrically to the sides of the vertical center line of the ring body and are spaced from one another thereby to define a gap having width less than that of the diameter of said cylindrical surface by a predetermined small amount, said tapered ring body being characterized by the ratio of the inside diameter of the bending beam to the seating diameter of the ring being less than 1; by the ratio of the inner-edge diameter of said bending beam to its said maximum section height being variable from 1.5 to 2.5; by the ratio of ring-body minimum to maximum section height varying between 0.6 to 0.8; by the degree of permissible spreading of the circle of the ring's inner-edge varying from 6 to 8.5%; by the gap angles lying between two lines, of which the first thereof is a line thru the center of the ring inside diameter perpendicular to a line bisecting the ring gap and the second thereof being a line from the same center extending to end-most real points on the ring inside diameter, varying from 9° to 16°; and means extending from the ring-body ends having gradually decreasing widths and defining a passageway leading to the gap and thence to the ring-body opening, the width of said gap being no less than 96% of the inside ring diameter, wherein 0.96 is the cosine of 16°.

2. A retaining ring according to claim 1, wherein said means comprises elongate spaced-apart leg formations, the mutually facing edges of which next adjacent the gap extending straightway and inclining away from one another, the distance from any point on one spaced-apart leg formation to a corresponding point of the opposite leg formation being greater than the width of the gap.

3. A spring retaining ring according to claim 2, wherein said leg-formation edges are also provided with mutually facing recesses in their end portions remote from the gap, said recesses providing for the accommodation of the points of ring-end spreading pliers.

4. A spring retaining ring according to claim 3, wherein each point on said recesses lies outside the space bounded by the lines which form the mutually facing inclined edges, whereby said recesses also serve the additional function of receiving longitudinal ribs extending outwardly from opposite sides of a rail.

* * * * *